Sept. 10, 1940.　　　G. M. SPACHER　　　2,214,682

INDICATING MECHANISM

Filed March 9, 1938

INVENTOR
GEORGE M. SPACHER
BY
ATTORNEY

Patented Sept. 10, 1940

2,214,682

UNITED STATES PATENT OFFICE 2,214,682

INDICATING MECHANISM

George M. Spacher, Rochester, N. Y.

Application March 9, 1938, Serial No. 194,890

1 Claim. (Cl. 88—24)

This invention relates to indicating mechanism for testing or other apparatus and has for one of its objects to provide an indicating mechanism giving visual indications.

A further object of this invention is to provide an optical indicator which will give indications with optical precision.

Figure 1:
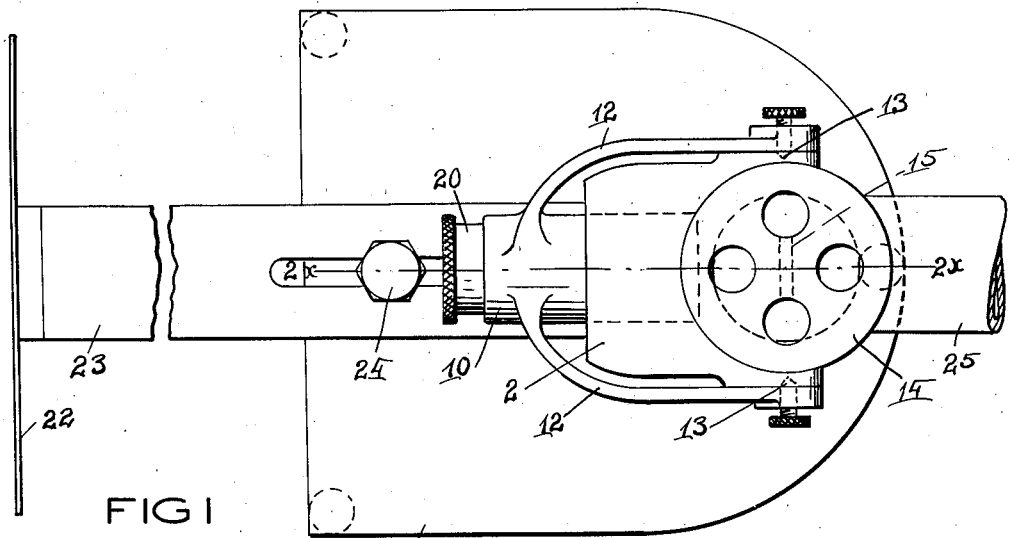

These and other objects and attendant advantages of the invention will become more clearly apparent from the detailed description of one embodiment thereof which follows, reference being had to the accompanying drawing in which Figure 1 is a top plan view of a testing apparatus provided with my novel indicating mechanism.

Figure 2:
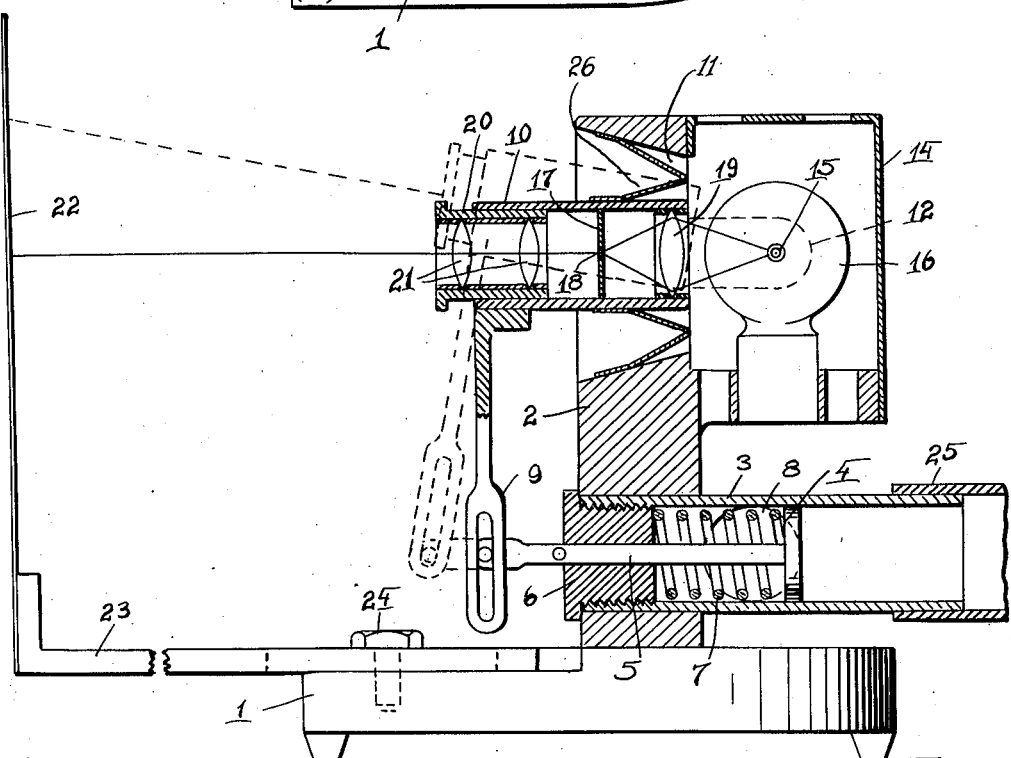

Figure 2 is a longitudinal sectional view of the testing apparatus and indicating mechanism, the section being taken on the line 2x—2x of Figure 1.

In the figures of the drawing like reference numerals indicate like parts.

This application and the invention disclosed herein is a continuation in part of my application Serial No. 41,713 filed September 23, 1935, and issued March 29, 1938, Patent No. 2,112,570. The testing apparatus shown and described in conjunction with the indicating mechanism is adapted for use in testing the rate of flow and regularity of exhaust gas impulses of internal combustion engines for the purpose of determining the operating efficiency of the engine in general and that of its individual operating members including the ignition system thereof.

As illustrated in the drawing the apparatus comprises a suitable base 1 which supports a standard 2 on which the testing and indicating mechanism is mounted. The testing mechanism comprises a cylinder 3 which is mounted in the lower portion of the standard 2. In the cylinder is mounted the piston 4 which operates the piston rod 5 thru the head 6. Spaced between the inside of the head 6 and the piston 4 is the compression spring 7 which holds the piston 4 to one side of the outlet 8 in the side of the cylinder 3 until the piston is displaced by the pressure of the gases and forced to the left in Figure 2 to partially uncover the outlet 3.

The outer end of the piston rod 5 is slidably connected to the arm 9 of the indicating mechanism so as to move this arm and operate the indicating mechanism as will presently appear.

The indicating mechanism comprises the projector tube 10 which is mounted to swing in a vertical plane in the opening 11 of the standard 2. For this purpose the projector tube is supported by a pair of arms 12, 12 which extend around the outside of the standard 2 to the rear thereof where these arms are pivotally mounted at 13, 13 on opposite sides of the lamp housing 14 concentric to the filament 15 of the glow lamp 16.

In the projector tube is provided the diaphragm 17 and in this diaphragm is located a light aperture in the form of a horizontal slit 18. A condenser lens 19 is suitably mounted at the inner end of the projector tube so as to focus the light from the filament 15 of the lamp 16 into the slit 18. In this way the glow lamp provides the fixed light source for the projection of a beam of light which is focused in the slit 18.

The forward end of the projector tube is provided with an adjustable sleeve 20 in which are mounted the projection lenses 21, 21 so that these lenses may be accurately focused in the projector tube to project the light beam from the slit 18 onto the screen 22.

The arm 9 which is connected to the piston rod 5 is attached to the projector tube 10 so that the movement of this arm by the piston 4 causes the projector tube to swing on a center which is in line with the filament 15 in order that light from this filament remains in constant focus in the light slit 18 and is uniformly projected onto the screen 22 to give a clearly visible light indication thereon. A suitable opaque screen in the form of collapsible bellows 26 or any other form is used to prevent light from passing thru the opening 11 around the projector tube 10.

The light screen 22 is supported on the end of the bracket 23 which in turn is adjustably mounted on the base 1 by means of the set screw 24 so that the screw may be horizontally adjusted relative to the testing apparatus and its indicating mechanism.

A suitable scale is provided on the screen 22 and this scale may be calibrated relative to the movement of the light beam which is projected by the indicating mechanism. The movement of the beam on the operation of the testing apparatus will thus indicate a regular or irregular movement, as the case may be, of the piston 4 as caused by the rate of flow and the regularity of the exhaust gas impulses of an internal combustion engine which has its exhaust connected to the cylinder 3 by means of a tube or other connection 25.

The range and regularity of movement of the light beam as given on the screen, can thus be compared with the standard movement of the light beam for an engine of the same power rating to determine its efficiency relative thereto. With the testing apparatus connected to the engine, various adjustments may then be made on the engine while observing the movement of the light beam until the light beam moves thru its proper range and its movements are regular.

I claim:

An optical indicator for indicating the variable reciprocating motion of a piston on a screen, comprising a normally fixed standard having an opening therethru, a housing supported by said standard with an opening in line with the opening in said standard, a projector lamp in said housing with its filament substantially in line with said openings, a projection tube, a projection objective, a condenser lens and a diaphragm with a central aperture therethru intermediate the objective and the condenser lens within said projection tube, an arm mounted to swing on said standard for the support of said projection tube in said opening of said standard and the pivotal movement of said projection tube and its optical axis about a trannsverse axis passing thru the projector lamp filament whereby the projected image of the aperture in said diaphragm is made to move in a line on the screen in the direction normal to the pivot axis when said projection tube is moved to swing by said arm in said opening of said standard about the pivot axis, and a link carried by said arm for connection with and oscillation by the piston.

GEORGE M. SPACHER.